(12) United States Patent
Heiligensetzer et al.

(10) Patent No.: US 7,086,293 B2
(45) Date of Patent: Aug. 8, 2006

(54) METHOD FOR MONITORING A MACHINE AND SUCH A MACHINE, PARTICULARLY A ROBOT

(75) Inventors: Peter Heiligensetzer, Augsburg (DE); Alwin Berninger, Aystetten (DE); Norbert Settele, Petersdorf-Wilprechtszell (DE)

(73) Assignee: KUKA Roboter GmbH (DE)

( * ) Notice: Subject to any disclaimer, the term of this patent is extended or adjusted under 35 U.S.C. 154(b) by 0 days.

(21) Appl. No.: 10/766,769

(22) Filed: Jan. 28, 2004

(65) Prior Publication Data

US 2004/0260481 A1 Dec. 23, 2004

(30) Foreign Application Priority Data

Feb. 1, 2003 (DE) ................. 103 04 019

(51) Int. Cl.
*G01N 3/00* (2006.01)
(52) U.S. Cl. ........................................ 73/795
(58) Field of Classification Search ................. 73/781, 73/1.15, 767, 774, 795, 763
See application file for complete search history.

(56) References Cited

U.S. PATENT DOCUMENTS

| | | | | |
|---|---|---|---|---|
| 4,640,663 A | * | 2/1987 | Niinomi et al. | 414/730 |
| 4,706,506 A | * | 11/1987 | Lestelle | 73/862.044 |
| 4,715,773 A | * | 12/1987 | Parker et al. | 414/730 |
| 4,783,107 A | * | 11/1988 | Parker et al. | 294/88 |
| 4,791,588 A | * | 12/1988 | Onda et al. | 700/260 |
| 5,081,593 A | * | 1/1992 | Pollack | 700/253 |
| 5,440,935 A | * | 8/1995 | Petersen | 73/765 |
| 2004/0260481 A1 | * | 12/2004 | Heiligensetzer et al. | 702/33 |

FOREIGN PATENT DOCUMENTS

| | | |
|---|---|---|
| DE | 32 44 738 C2 | 6/1984 |
| DE | 34 07 618 A1 | 9/1985 |
| DE | 36 07 588 A1 | 9/1986 |
| DE | 36 24 941 C2 | 1/1988 |
| DE | 44 32 759 A1 | 3/1996 |
| DE | 100 20 174 A1 | 11/2001 |
| JP | 05269684 A * | 10/1993 |

* cited by examiner

*Primary Examiner*—Max Noori
(74) *Attorney, Agent, or Firm*—McGlew and Tuttle

(57) ABSTRACT

In order to improve the monitoring of a machine with movable parts, such as in particular an industrial robot, and for increasing safety, the invention provides a method for monitoring movable parts of a machine, such as an industrial robot, in which at least two different measured quantities are detected and at least one of these measured quantities is processed to a first measure result in such a way that it is comparable with another measured quantity or a second measure result obtained on the basis thereof, that the first measure result is compared with another measured quantity or a measure result obtained on the basis thereof and that a signal characterizing the comparison result is provided.

The invention also provides a machine with movable parts, such as in particular an industrial robot, which is characterized by at least two measuring devices for detecting different measured quantities on movable parts of the machine, a processing unit for at least one measured quantity for the processing thereof into a first measure result comparable with another measured quantity or a second measure result obtained therefrom and a comparison unit for comparing the first measure result with at least one other measured quantity or a second measure result obtained on the basis thereof.

18 Claims, 6 Drawing Sheets

METHOD FOR MONITORING A MACHINE AND SUCH A MACHINE, PARTICULARLY A ROBOT

FIELD OF THE INVENTION

The invention relates to a method for monitoring movable parts of a machine, such as an industrial robot, as well as to a machine with movable parts, such as in particular industrial robots.

BACKGROUND OF THE INVENTION

The following measures are known for implementing a socalled "safe robot":
- limiting the axis or axle speed by software restriction;
- limiting speeds by restricting the intermediate circuit strain;
- monitoring the speed and/or position via several redundant monitoring channels;
- collision monitoring by monitoring the drive moments via the motor currents;
- collision monitoring by separate sensor systems, e.g. for detecting an approach to obstacles (capacitive, in ductive, ultrasonic, visual) or contact forces (pressure measuring mats with different physical principles);
- exclusion of specific parts of the operating area by mechanical stops or by software.

In part the indicated measures are not safe as the sole measures, but only fulfil this requirement in conjunction with at least one further monitoring channel and in part they are complicated and costly. Thus, generally through a multichannel system, i.e. monitoring and making use of several measurements an adequate redundancy is provided. Moreover, up to now even a redundant monitoring has involved identical or related measured quantities solely being detected by two or more sensors in the form of measured values, which are transmitted and processed by means of separate channels, so that it was only possible to eliminate errors in the detection, transmission and processing, but not with respect to the detected measured or physical quantities.

The problem of the invention is to improve the monitoring of a machine, such as an industrial robot, in order to increase safety.

SUMMARY OF THE INVENTION

According to the invention the set problem is solved with a method of the aforementioned type wherein measured values of at least two different measured quantities are detected and at least one of these measured values is processed to a first measure result in such a way that it is comparable with the measured value of another measured quantity or a second measure result obtained as a result thereof, that the first measure result is compared with the measured value of another measured quantity or a measure result obtained as a result thereof and that a signal characterizing the comparison result is provided.

The set problem is also solved by a machine with movable parts, such as in particular an industrial robot, characterized by at least two measuring devices for detecting different measured quantities as measured values on movable parts of the machine, at least one processing unit for at least one measured value of a measured quantity for processing the same into a first measure result comparable with another measured value of another measured quantity or a second measure result obtained therefrom and by a comparison unit for comparing the first measure result with at least the measured value of another measured quantity or a second measure result obtained as a result thereof.

The measured quantity is the physical quantity to be measured and the measured value the direct result of a sensor and optionally converter and the measure result is the result of a mathematical and in particular electronic processing of a measured value, particularly in order to obtain a starting value with the measured value or a measure result of another physical quantity derived therefrom.

As a result of the invention different or diverse physical measured quantities are used for the redundant monitoring of a robot and consequently different measured signals or values are made available. This leads to a better, redundant and therefore safe monitoring of a machine with movable parts, particularly an industrial robot, particularly so as to ensure that the machine or the robot in general or in situation-dependent manner does not exceed preset speeds, which is important for limiting the slowing down path in the case of a stop and for limiting the kinetic energy and it must also be ensured that robots do not exceed preset acceleration values, which is important for avoiding uncontrolled movement states in the case of interference in the control and that finally collisions with obstacles are reliably detected.

According to a highly preferred development, e.g. in addition to the monitoring of the movement of a robot by motor current measurements it is provided that as at least one measured quantity material strains on parts of the machine are measured or measuring devices are used for determining material strains.

It is particularly important that through the measurement of material strains or the construction of a machine or robot in such a way that material strains are measured thereon, this makes available an additional, differing measuring and processing channel, whose measured signal or value is not dependent on corresponding values in the machine/robot control, such as e.g. stray material measurements, so that interfering influences do not lead to systematically identical or similar errors of measurement in all the different measuring and processing channels. In addition, the measured value obtained from the material strain can additionally be used for other purposes.

In particular the inventive monitoring of material strains indirectly makes it possible to monitor the moments of reaction and forces as a result of collisions, accelerations and velocities of motion (centrifugal and coriolis force), which lead to a stressing or loading of the robot structure and therefore to the material strains to be measured.

Preferably material strains are measured at several points of the machine/robot structure and preferably corresponding transducers are fitted to at least two sides of a machine/robot part, such as the rocker or robot arm and preferably on two facing sides, i.e. the top and bottom and right and left-hand sides.

According to a preferred development of the method according to the invention, the material strains are measured by means of at least one transducer and in particular the material strains are measured by means of a strain gauge or material strains are measured by means of a light guide-based pickup. An inventive machine, such as a robot is, according to a further development, constructed in such a way that the devices for determining material strains are constructed as transducers and in particular the devices for determining material strains are constructed as strain gauges or the devices for determining the material strains are constructed as piezoelectric or light guide-based pickups. It is fundamentally possible to use different types of transducers, i.e. to combine those mentioned hereinbefore.

As the pattern of the measured quantity to be measured and therefore the measured values obtained by the measurement, particularly material strains, can be very complex as a result of the superimposing of forces and moments, the evaluation of the sensor information preferably takes place by the comparison of reference curves, which can be produced synthetically by calculation using a corresponding mathematical model or by recording the real measured values under known conditions and without interfering influences. According to another preferred development actual measured values or measure results are compared with reference values and in particular actual measured values or measure results are compared with reference values whilst taking account of tolerances and/or tolerances are taken into account by the formation of a reference corridor to a reference curve. If the measured values or results diverge to a greater than allowed extent from the corresponding reference curve, a conclusion can be drawn concerning an unforeseen event, e.g. a collision with the operator. The permitted divergence limit is defined by a tolerance band (reference corridor).

In preferred manner, in the case of divergences of expected measured values or results the machine is stopped and in particular, as intimated hereinbefore, the measurement of material strains for monitoring the movement of a robot takes place together with the measurement of other monitoring quantities as redundant monitoring.

According to a further development of the machine according to the invention, on at least two surfaces of a robot part there is in each case a device for determining material strains.

In a preferred development a monitoring device is provided and to it is connected a device for determining material strains on machine/robot parts.

The redundancy when testing for unexpected results is obtained by the simultaneous evaluation of the inventively monitored material strains together with at least one further measuring channel and for this purpose use can be made of positions and/or velocities determined by software in the control means via the path measuring system, as well as motor moments, which are measured by means of current sensors in the drive amplifiers or boosters.

Interference freedom can be concluded if none of the redundant measuring channels indicates an exceeding of the tolerance band. If exceeding is indicated by at least one of the measuring channels the robot is stopped by a safe logic and brought into a safe state by brakes being locked and drives switched into a nondissipative state.

BRIEF DESCRIPTION OF THE DRAWINGS

Further advantages and features of the invention can be gathered from the claims and the following description of embodiments of the invention with reference to the attached drawings, wherein show:

DETAILED DESCRIPTION OF THE DRAWINGS

Figure 1:
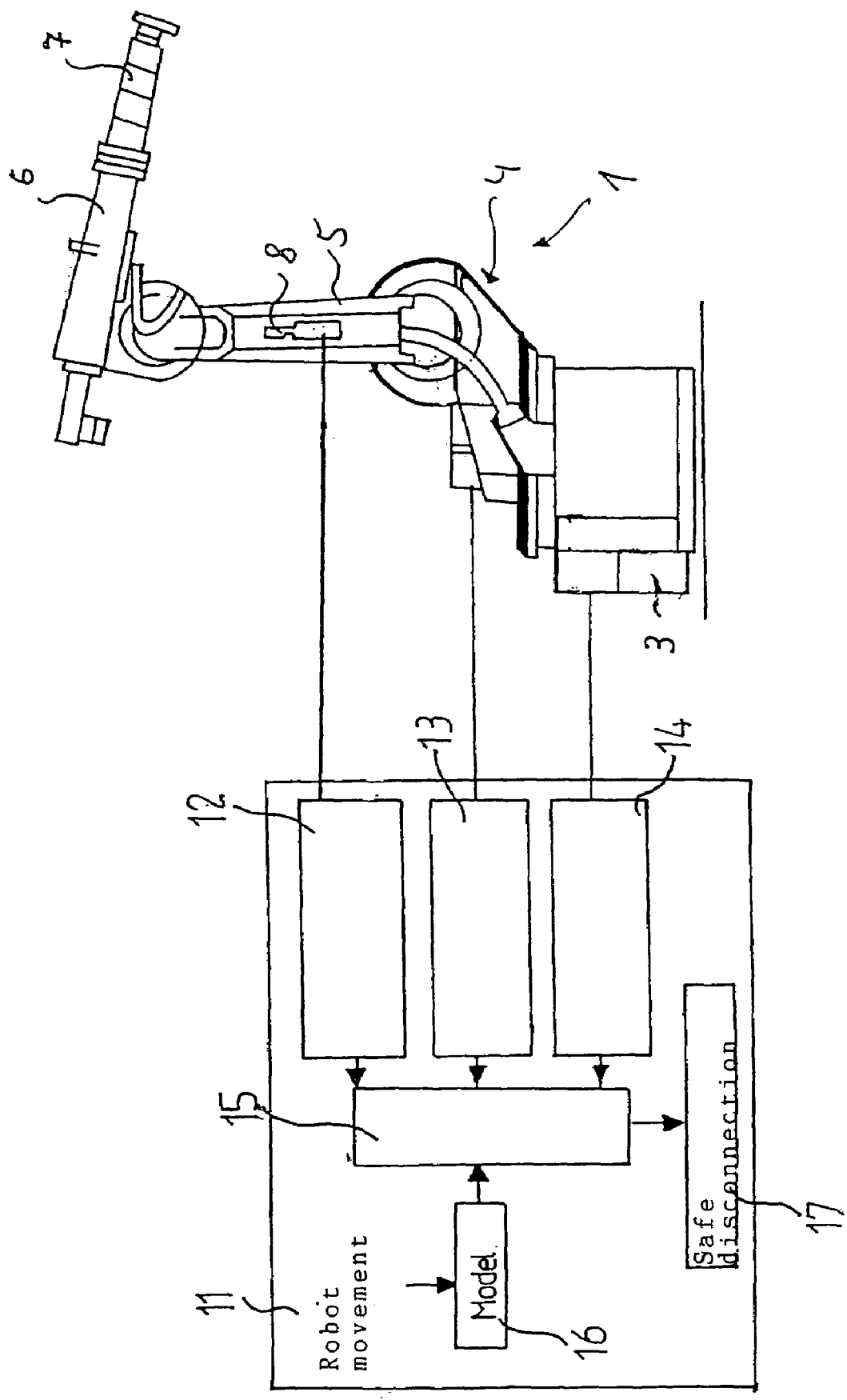
FIG. 1 A block diagram for monitoring the movements of a robot.

FIG. 1 shows a block diagram for performing the inventive method of monitoring a robot by means of the reception of different, diverse, physical measured quantities by means of a redundant measuring system using the example of material strains in the structure of an industrial robot 1.5.

When operating a robot forces and moments can occur in parts thereof which lead to material strains within the robot parts and which by means of suitable devices such as strain gauges 8 or also not shown, light guide-based pickups and which can therefore be monitored during robot operation in connection with the divergence from predetermined value patterns or predetermined/expected value patterns.

The industrial robot of FIG. 1 has a robot base 2, an inverter 3 located thereon, a carrousel 4 rotatable about the vertical, first robot axis A1 and placed on the base 2, a robot rocker 5 pivotably articulated about the horizontal, second axis A2, a robot arm 6 pivotably articulated about a further horizontal robot axis A3 on its free end remote from the rocker 5 and on whose free end remote from the robot arm 6 is located a robot hand 7. Strain gauges 8 are located on the rocker 5 and robot arm 6.

A robot 1 is shown and in block diagram form a monitoring device 11. The monitoring device 11 has a monitoring unit 12 for monitoring elongations of the robot structure, a monitoring unit 13 for monitoring the position of robot parts whilst taking account of the chronology and therefore the speed, as well as finally a monitoring unit 14 for monitoring the motor current from the inverters 3 and therefore the drive moment.

The measured values or results measured by the units 12, 13, 14 are compared with the model values of a model 16 in a comparison unit 15 within the framework of the monitoring device 11. If the measured values diverge from predetermined values or a predetermined pattern, a safe disconnection of the robot occurs by using an operating or switching device 17.

Figure 2:
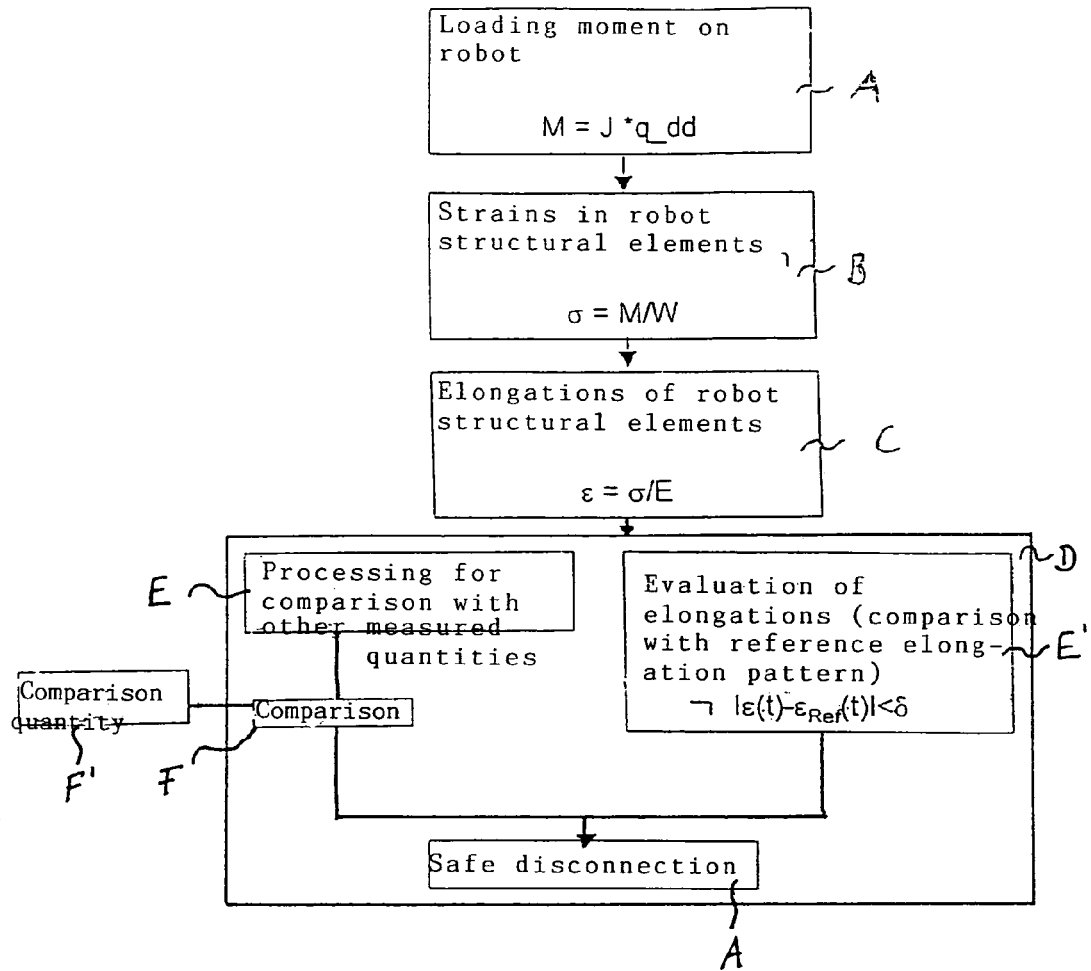
FIG. 2 A diagram for determining and evaluating material strains on a machine/robot part.

FIG. 2 is a diagram for the determination and evaluation of material strains on a machine or robot part.

For example in the case of a robot, as a result of accelerations and collisions, (braking, negative acceleration) as a reaction thereto occur reaction loading moments M in accordance with $$M = J * q\_dd \quad (1)$$

J being the mass moment of inertia and q_dd the angular acceleration about an axis (step A in FIG. 2).

This loading moment leads according to $$\sigma = M/W \quad (2)$$

in which W is the moment of resistance, to strains on the robot structural elements σ (step B).

In turn, these strains lead according to Hooke's law to $$\epsilon = \sigma/E \quad (3)$$

to elongation ε on the robot part, E being the modulus of elasticity, which can be detected and/or measured using strain gauges (step C).

The measured elongation values ε can now be further processed in such a way that the measured elongation values and therefore the strain measurements can be compared with other measured values of other measured quantities, e.g. motor current values (step E). In a further step F a comparison takes place with a further measured quantity F' and in the case that both indicate an error, fault, dangerous situation, etc., a reliable disconnection occurs (step G). Additionally or alternatively there is a direct evaluation of elongations, i.e. the comparison with a reference elongation curve (step E') and if the comparison reveals that the measure result drops out of the reference elongation curve or reference corridor, there is also a safe disconnection (step G).

Figure 3:
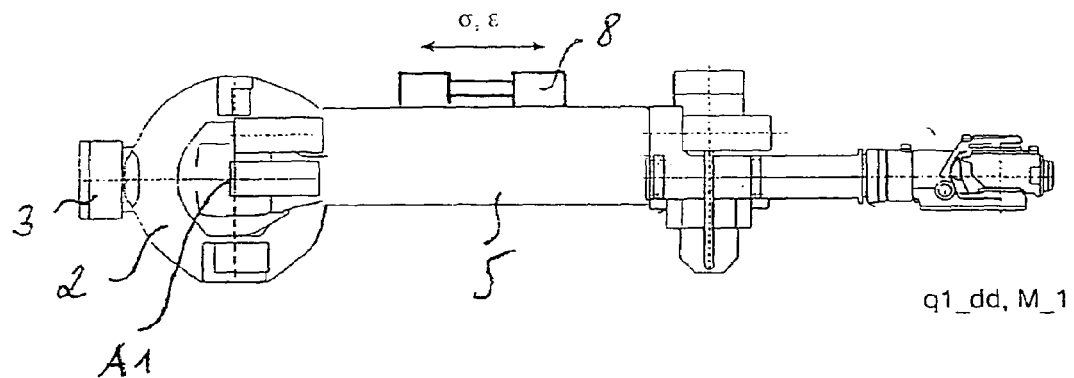
FIG. 3 A specific embodiment for determining material strains on a machine/robot as a result of a movement about the A1 axis.

FIG. 3 shows that for the determination of the loading moments of the robot rocker in the case of a movement thereof (and the following robot elements) about the vertical axis A1, a strain gauge 8 is located on one side (the right or left-hand side of the robot rocker 5).

Figure 4:
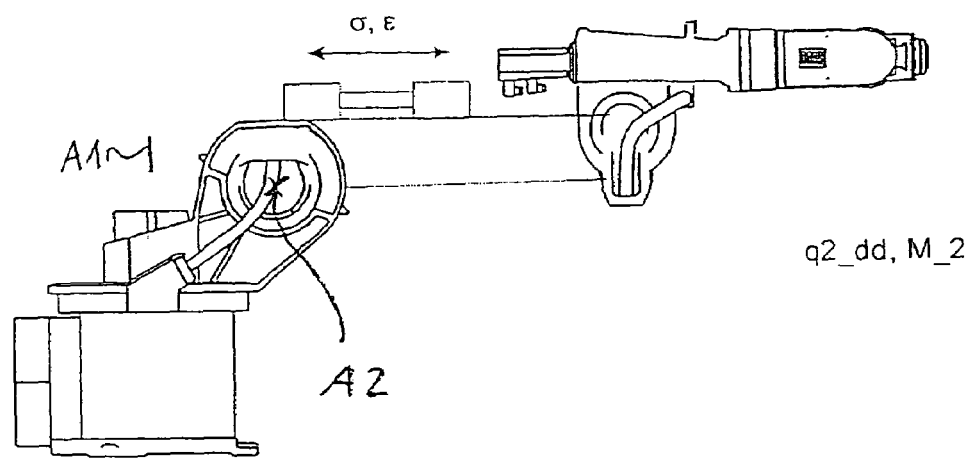
FIG. 4 A specific embodiment for determining material strains on a robot on the basis of a movement about the A3 axis.

FIG. 4 shows that for the detection of the reaction or loading moments of a movement about the first, horizontal axis A2 a corresponding strain gauge 8 is to be placed on the top (or bottom) of the rocker 5.

Figure 5:
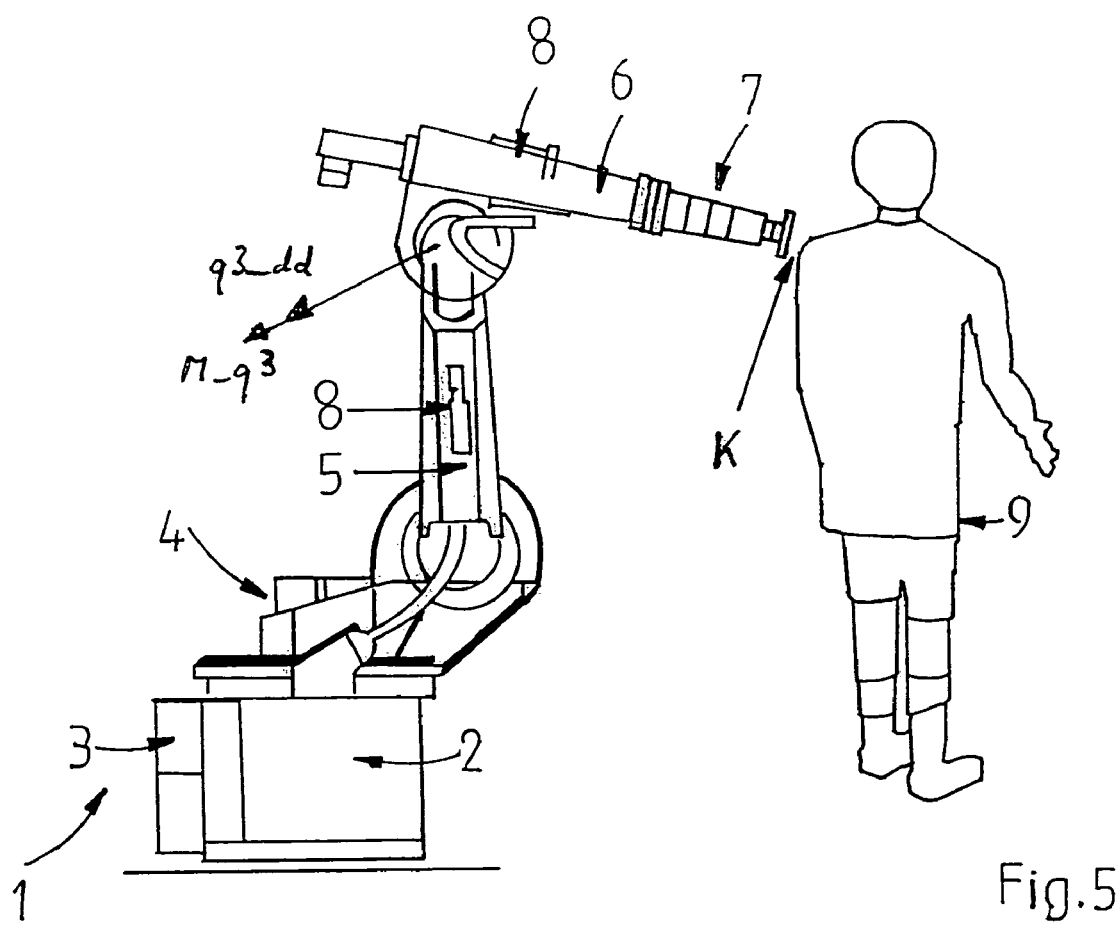
FIG. 5 A robot, whose robot arm comes into contact with the shoulder of a person.
Figure 6:
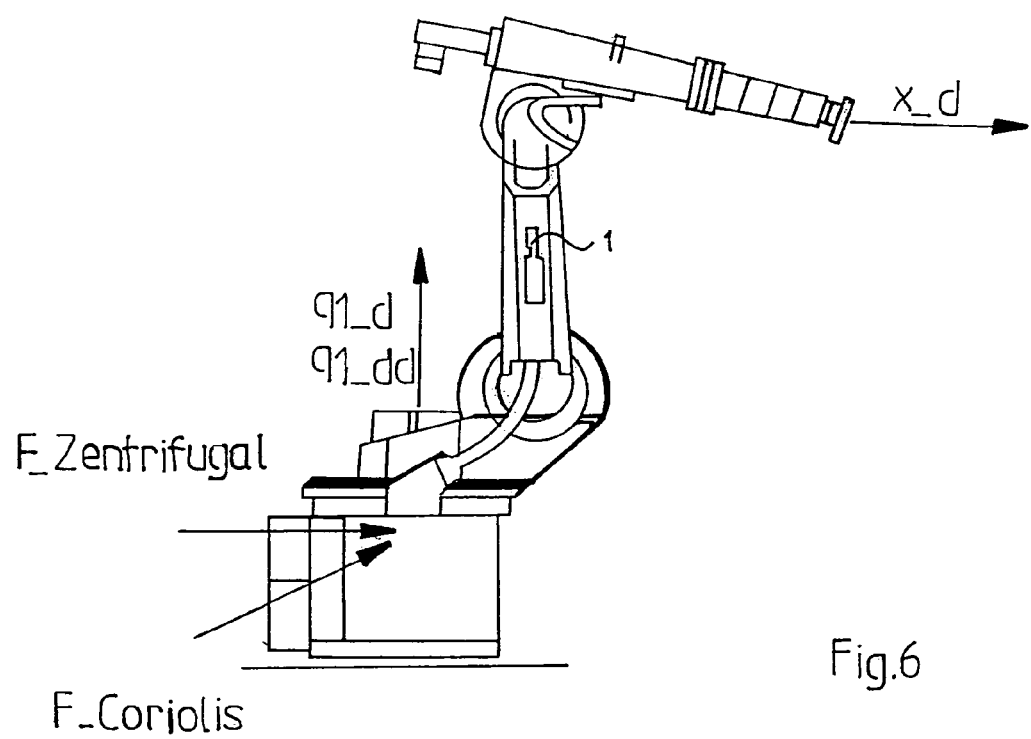
FIG. 6 A robot with a diagrammatic representation of the moment of reaction on the acceleration of the A3 axis.
Figure 7:
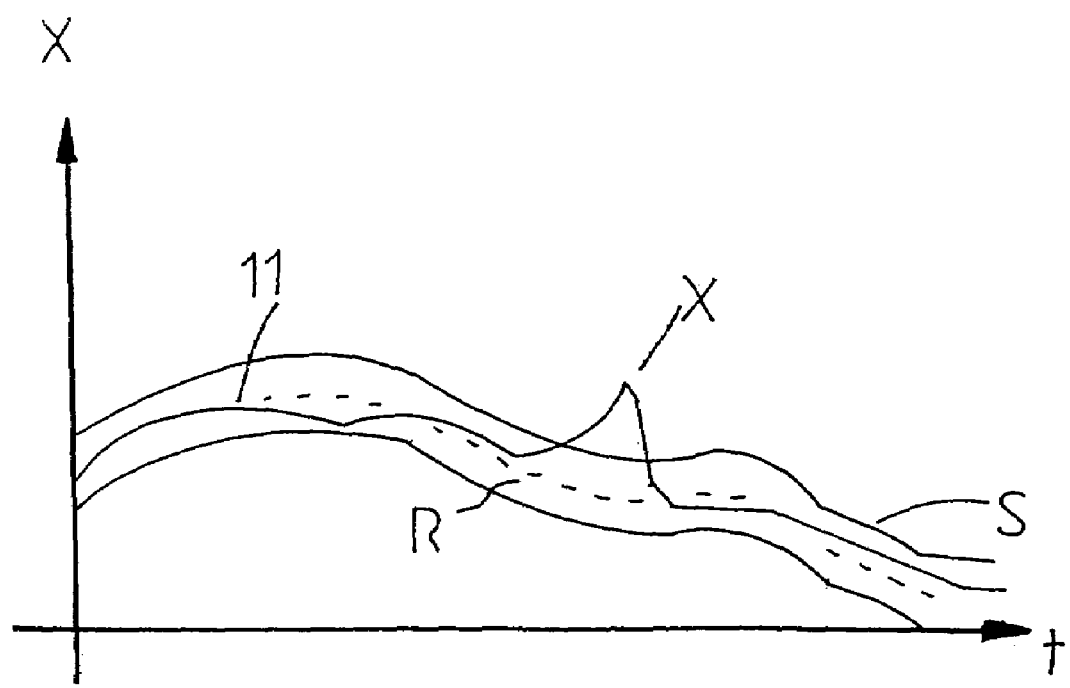
FIG. 7 A robot with diagrammatic representation of the centrifugal and coriolis forces occurring during a movement about the vertical A1 axis.

FIGS. 5 to 7 show specific embodiments of the method according to the invention and a robot, as an example of the machine according to the invention with movable parts and the monitoring of the machine or robot 1 by the detection of the physical measured quantity the material strain. FIG. 5 also diagrammatically shows a person 9.

If e.g. a robot arm 6 strikes from above, as shown in FIG. 5, the shoulder of a person or strikes from above on another object, then there are increased bending moments in the robot arm 6 and therefore material strains therein, which can be measured by strain gauges 8 on the robot arm 6, particularly strain gauges 8 placed on the top and bottom of the arm. The same applies in the case of the lateral striking of the robot arm against a person or object and in this case there are preferably right and left-hand strain gauges 8 on the robot arm 6 for material strain measurement. If in the direction of the extension of the robot arm 6, the front of the latter or a tool connected thereto strikes against an obstacle, such as a person, bending moments and therefore material strains more particularly occur in the rocker 4.

As has already been stated in connection with FIG. 2 and as can be gathered from FIG. 5, in the case of an acceleration or deceleration of robot axes moments occur in accordance with the formula $$M\_q_i = q_{i\_}dd * J$$

in which $M\_q_i$ is the moment of reaction on the acceleration of the axis i, in FIG. 5 the A3 axis, $q_{i\_}dd$ is the angular acceleration of the axis i and J the mass moment of inertia. These moments lead to material strains which can be detected by suitable transducers, such as in particular strain gauges or light guide-based pickups.

FIG. 6 makes it clear that with a constant movement of the robot there are centrifugal and coriolis forces corresponding to $$F\_centrifugal = m \cdot (q\_d)^2 * r$$

or the coriolis force $$F\_coriolis = 2 * m * (qd \times s\_d),$$

in which F_centrifugal is the centrifugal force, m the mass, q_d the angular velocity, r the radius, F_coriolis the coriolis force and s_d the translatory speed.

The sensors detecting the resulting material strains provide a constant picture of the structural loading during robot operation. The measured values obtained can be further processed and used in numerous different ways, particularly online for monitoring and safety purposes, so as to permanently compare the measured values with predetermined guidance or limit values so as in this way to ensure the safety of the human-machine system, in that movements, namely velocities or accelerations, are kept within an acceptable range and/or a stoppage occurs if a robot part strikes against a human.

FIG. 7 shows in graph form where the location of a robot is plotted against time, shows a reference curve R for a predetermined movement of the robot or a robot part. An acceptable range is associated as a reference corridor S with the reference curve R. It is also possible to see a measurement curve M indicating the actual location of the robot part in the case of an operating sequence with respect to time. In area x the measurement curve M moves out of the reference corridor S and consequently indicates an inadmissible movement or collision with unexpected measured values and this can e.g. lead to a disconnection of the robot.

LIST OF REFERENCE NUMERALS

1 Industrial robot
2 Robot base
3 Inverter
4 Carrousel
5 Robot rocker
6 Robot arm
7 Robot hand
8 Strain gauge
9 Person
11 Monitoring device
12/13/14 Monitoring unit
15 Comparison unit
16 Model
17 Switching/operating device
M Measurement curve
R Reference curve
S Reference corridor
x Area

The invention claimed is:

1. A method for monitoring movable parts of an industrial robot machine, the method comprising the steps of:
   providing a reference value or a reference corridor to a reference curve generated by a calculated reference result using a mathematical model in a calculation or by recording real measure values under known conditions without any interfering influences for the movable parts of the machine;
   measuring physical material strains on parts of the machine by sensors or transducers arranged on the robot to arrive at a measured quantity;
   comparing said measured quantity with said reference value prior to transforming into an actual measured value of said measured quantity; and
   comparing said actual measured value of said measured quantities and/or calculated measured results with said reference value, whilst taking account of tolerances to arrive at a comparison result, wherein said comparison result produces information about either interference freedom or an unexpected event, including a collision.

2. A method for monitoring movable parts of an industrial robot machine according to claim 1, wherein measured values of at least two different physical quantities are measured and at least one of these measured values is processed to a first measure result in such a way that it is comparable with another measured value of another measured quantity or a second measure result obtained as a result thereof, that said first measure result is compared with said another measured value of said another measured quantity or said second measure result obtained as a result thereof and that a signal characterizing said comparison result is provided.

3. A method according to claim 1, wherein said material strains are measured by means of at least one transducer.

4. A method according to claim 1, wherein said material strains are measured by means of a strain gauge.

5. A method according to claim 1, wherein said material strains are measured by means of piezoelectric or light guide-based pickups.

6. A method according to claim 1, wherein said material strains are measured by means of a set of transducers positioned on at least two surfaces of a robot part.

7. A method according to claim 1, wherein said tolerances are taken into account by forming said reference corridor to said reference curve.

8. A method according to claim 1, wherein in the case of divergences from expected said reference values and/or calculated measured results, the machine is stopped or brought into a safe state.

9. A machine with movable parts for an industrial robot, the machine comprising:
a plurality of measuring devices for determining physical material strains; and
a comparison device for comparing actual measured values and/or calculated measure results with an expected reference value of predetermined models for robot movements, whilst taking account of tolerances, wherein said reference value or a reference corridor to a reference curve is generated by calculation using a mathematical model or by recording real measure values under known conditions without any interfering influences, an output of said comparison device giving information about either an interference from movement freedom or an unexpected event including a collision.

10. A machine according to claim 9, wherein at least two said measuring devices are provided for determining said material strains and a comparison device for comparing actual measured values and/or calculated measure results with predetermined models for robot movements, and a plurality of said measured value of at least two different measured quantities are detected and at least one of these measured values is processed to a first measure result in such a way that it is comparable with another measured value of another measured quantity or a second measure result obtained as a result thereof, that said first measure result is compared with said another measured value of said another measured quantity or said second measure result obtained as a result thereof and that a signal characterizing said comparison result is provided and said output of said comparison device giving information about an unexpected event including a collision.

11. A machine according to claim 9, wherein said devices for determining materials strains are constructed as transducers.

12. A machine according to claim 9, wherein said devices for determining material strains are constructed as strain gauges.

13. A machine according to claim 9, wherein said devices for determining material strains are constructed as light guide-based pickups.

14. A machine according to claim 9, wherein in each case at least one device for determining material strains is placed on at least two surfaces of a robot part.

15. A machine according to claim 9, wherein a monitoring device is provided to which is connected at least one device for determining material strains on machine parts.

16. A machine according to claim 15, wherein said monitoring device has a unit for monitoring at least elongations of said machine structure and another unit for monitoring a further measured quantity.

17. A machine according to claim 16, wherein said monitoring device has a device for disconnecting said machine.

18. A machine according to claim 9, wherein in the case of divergences from expected said reference value and/or calculated measure results, the machine is stopped or brought into a safe state.

* * * * *